Patented Sept. 24, 1929

1,728,987

UNITED STATES PATENT OFFICE

KARL THIESS, OF SINDLINGEN, NEAR HOCHST-ON-THE-MAIN, AND CARL JOSEF MÜLLER AND ERWIN HOFFA, OF HOCHST-ON-THE-MAIN, GERMANY, ASSIGNORS, BY MESNE ASSIGNMENTS, TO GENERAL ANILINE WORKS, INC., OF NEW YORK, N. Y., A CORPORATION OF DELAWARE

BLUE VAT DYESTUFFS

No Drawing. Application filed January 4, 1924, Serial No. 684,452, and in Germany January 27, 1923.

It is known that vat dyestuffs obtained by direct halogenation of vat-dyestuffs of the thioindigo-, indigo- and indigoid series have still more or less similarity with dyestuffs free of halogen as regards their tints; thus e. g. the halogenated indigo dyestuffs give much clearer shades than indigo itself but all still dye blue shades, and halogen derivatives obtained from thioindigo all still dye carmin-red to bluish-red tints the halogenated indigoid vat-dyestuffs, derived for instance from α-isatinchloride and α-naphthol, all more or less clear blue tints.

Now we have made the striking observation which is of great importance for the technic of dyeing viz, that the 2.3-2'.3'-bis-naphth-thionaphthenindigo giving grey-black tints with a green hue (produced according to German Patent 240,118, dated June 29, 1910, to Kalle & Co. A. G. Biebrich-on-Rhine, the statements of the specification as to the dyestuff dyeing greenish-blue shades being incorrect) can be transformed into vat-dyestuffs dyeing indigo-blue tints by means of halogenation. Thus, it has now become possible to prepare easily accessible vat-dyestuffs dyeing indigo-blue tints, but fast to chlorine, kier-boiling and to light. The halogenation may be effected according to the known methods.

The products may be represented by the following general formula:

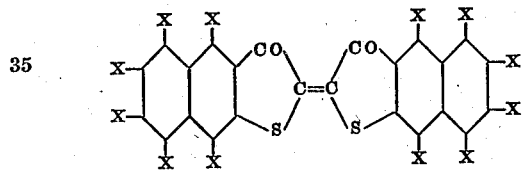

wherein X stands for hydrogen, halogen or an alkyl group, at least one X being a halogen.

The following examples illustrate our invention:

1. 40 parts by weight of 2.3-naphththio-indigo (2.3-2'.3' bis naphththionaphthenin- digo) are suspended in 400 parts of dry nitrobenzene and mixed with 40 parts of bromine. This mixture is stirred for about one hour at ordinary temperature and then slowly heated until it boils gently. At about 120° C. evolution of hydrogen bromide sets in which is complete after 2–3 hours. After cooling, the reaction product is filtered off and freed from the adhering nitrobenzene by one of the usual methods.

The dyestuff obtained according to this example may be represented by the following structural formula:

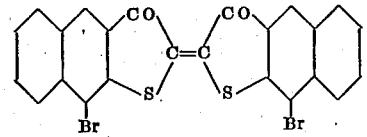

The dyestuff thus obtained forms a reddish-blue powder which difficultly dissolves in sulphuric acid with an olive-green colour and dyes cotton very fast indigo-blue tints. It contains 28–29% of bromine which corresponds to the introduction of 2 atoms of bromine.

2. 40 parts of 2.3-naphththioindigo are introduced while stirring and cooling into 800 parts of sulphuric acid (66° Bé.). After some time 25 parts of bromine are slowly run into this mixture and stirring is continued, at first while cooling and after 2–3 hours at ordinary temperature, until the dyestuff no longer takes up any bromine. The product thus obtained is poured on a mixture of ice and bisulfite, filtered and washed until it becomes neutral. The resulting dyestuff is substantially identical with that described in Example 1 and may be represented by the same structural formula.

3. 40 parts of 2.3-naphththioindigo are suspended in 400 parts of dry nitrobenzene. After having added a small quantity of iodine a strong current of dry chlorine is passed through this suspension while heating on the water-bath until a test-sample shows an amount of chlorine of 15,3% (corresponding to 2 atoms of chlorine) the dyestuff thus obtained dyes somewhat redder tints than that obtained according to Example 1.

The dyestuff obtained according to this example may be represented by the following structural formula:

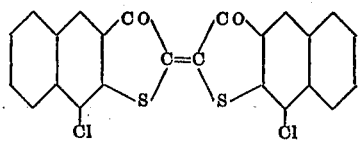

4. 40 parts of 2.3-naphththioindigo are triturated with 600 parts of dry chlorobenzene, then diluted with 400 parts of chlorobenzene and there are then added drop by drop at 40° C. 20 parts of sulphurylchloride. This temperature is now kept at 70–80° for two hours and then at 120–130° until the evolution of hydrochloric acid ceases. The isolated dyestuff is substantially a monochloro-derivative of the 2.3-naphththioindigo and dyes cotton very fast well covering blue tints which have a more greenish hue than those of the dihalogen products. Analysis of the product proves that it contains 8–9% chlorine, from which may be concluded that it is a monochloro-derivative.

The dyestuff obtained according to this example may be represented by the following structural formula:

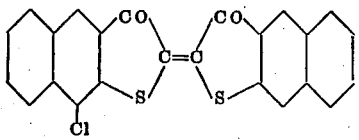

5. 40 parts of 2.3-naphththioindigo are introduced into 400 parts of nitrobenzene. After having added 18 parts of bromine the mixture is stirred for some time, while cold and then at 140° until the evolution of hydrogen bromide ceases. The isolated dyestuff represents a monobromo derivative containing 16,2% of bromine, of the 2.3-naphththioindigo which dyes cotton dark blue intense tints.

The dyestuff obtained according to this example may be represented by the following structural formula:

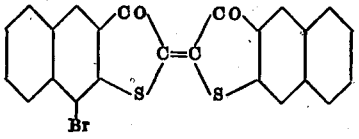

6. Into a solution of 20 parts of bromine in 800 parts of chlorosulfonic acid are introduced while well cooling, 40 parts of 2.3-2'.3'-naphththioindigo. After 2-3 hours a further quantity of 20 parts of bromine are run into the mixture whereupon it is stirred for some further time, poured on ice and filtered. The dyestuff obtained contains 4 atoms of bromine (44.5%) and dyes cotton pure blue tints.

The dyestuff obtained according to this example may be represented by the following structural formula:

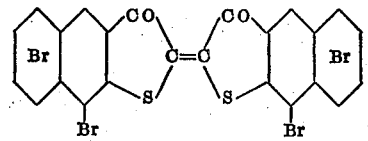

7. 43 parts of the monochloro-2.3-naphththioindigo obtained according to example 4 are suspended in 400 parts of nitrobenzene and after the addition of 18 parts of bromine gradually heated to about 140° C., until the evolution of hydrogen bromide ceases. The isolated dyestuff contains besides an atom of chlorine 1 atom of bromine and dyes cotton well-covering blue tints. The analysis shows an amount of bromine of 15,5% and an amount of chlorine of 7%.

The dyestuff obtained according to this example may be represented by the following structural formula:

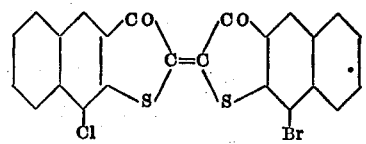

The halogenation may also be carried out by any of the known methods for instance in concentrated sulphuric acid. Instead of the halogens there may, as usual, be used halogen introducing agents such, for instance, as sulphuryl chloride.

The properties of the dyestuffs obtained according to the above examples are in general similar. They are violet-blue to blue powders, which dye fibers blue in hydrosulfite vats. In most organic solvents they are but slightly soluble even upon heating. They dissolve with characteristic colors in concentrated sulfuric acid.

Having now described our invention what we claim is:

1. As new products the halogenated bodies of the general formula:

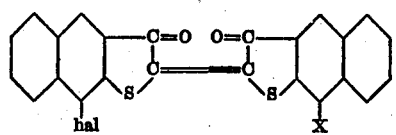

wherein X stands for chlorine or hydrogen.

2. As new products the halogenated bodies of the general formula:

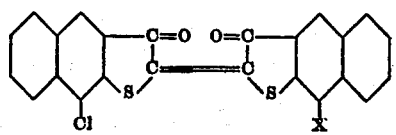

wherein X stands for hydrogen or halogen.

3. As a new product the vat dyestuff of the following formula:
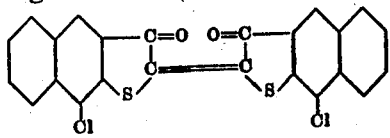
In testimony whereof, we affix our signatures.
KARL THIESS.
CARL JOSEF MÜLLER.
ERWIN HOFFA.